Figure 1:
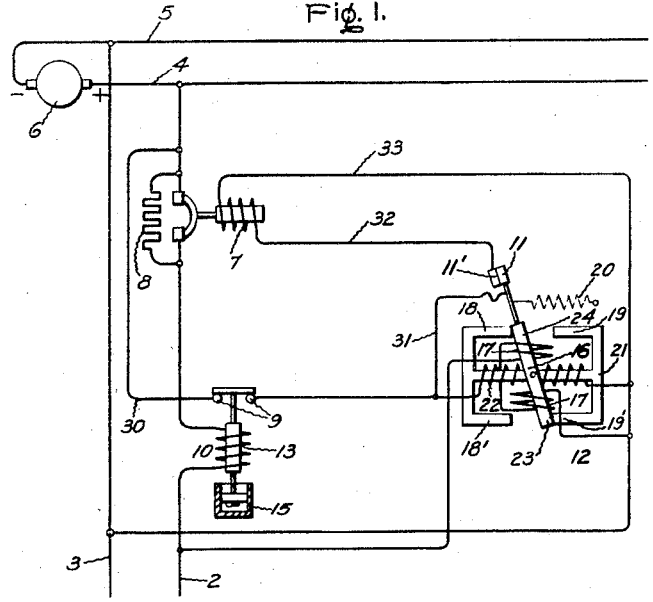

Dec. 22, 1925.

O. C. TRAVER 1,567,016

AUTOMATIC RECLOSING CIRCUIT BREAKER SYSTEM

Filed Dec. 20, 1921  3 Sheets-Sheet 1

Inventor:
Oliver C. Traver,
by Albert S. Davis
His Attorney

Dec. 22, 1925.  1,567,016
O. C. TRAVER
AUTOMATIC RECLOSING CIRCUIT BREAKER SYSTEM
Filed Dec. 20, 1921  3 Sheets-Sheet 3

Inventor:
Oliver C. Traver,
by *Albert G. Davis*
His Attorney

Patented Dec. 22, 1925.

1,567,016

UNITED STATES PATENT OFFICE.

OLIVER C. TRAVER, OF SCHENECTADY, NEW YORK, ASSIGNOR TO GENERAL ELECTRIC COMPANY, A CORPORATION OF NEW YORK.

AUTOMATIC RECLOSING CIRCUIT-BREAKER SYSTEM.

Application filed December 20, 1921. Serial No. 523,756.

*To all whom it may concern:*

Be it known that I, OLIVER C. TRAVER, a citizen of the United States, residing at Schenectady, county of Schenectady, State of New York, have invented certain new and useful Improvements in Automatic Reclosing Circuit-Breaker Systems, of which the following is a specification.

My invention relates to automatic reclosing circuit breaker systems and particularly to such systems in which a circuit breaker is arranged to connect a load circuit to a source of current whenever the source of current is energized and the load resistance is above a predetermined value.

In automatic reclosing circuit breaker systems it has been proposed to provide a current limiting impedance, such as a resistor, in parallel with the contacts of the circuit breaker so that a small current flows through the load circuit when the circuit breaker is open and to control the closing circuit of the circuit breaker in response to the potential drop across the load circuit produced by this small current. In order to keep the number of watts consumed in the current limiting impedance as small as possible when the circuit breaker is open, it is necessary to keep this feeling-out current very small, usually one or two per cent of the normal full load value. Furthermore, since it is usually desirable to close the circuit breaker as soon as the load resistance is approximately equal to the full load value which is small compared to the resistance of the current limiting resistor, it is apparent that the reclosing relay which responds to the potential across the load circuit has to be very sensitive. Heretofore, it has been necessary to disconnect this reclosing relay from the load circuit before the circuit breaker closes in order to prevent the relay from being damaged by the high voltage impressed thereon when the circuit breaker is closed, as it has not been possible to design a relay which has the desired sensitiveness and at the same time can stand the high voltage impressed thereon when the circuit breaker is closed. I find that by constructing the reclosing relay as a polarized relay, I am able to obtain a relay which has the desired sensitiveness and which can be permanently connected across the load circuit, thereby making it unnecessary to complicate the system by the provision of switching apparatus and circuits to connect and disconnect the relay.

My invention will be better understood from the following description taken in connection with the accompanying drawings and its scope will be pointed out in the appended claims.

Figure 2:
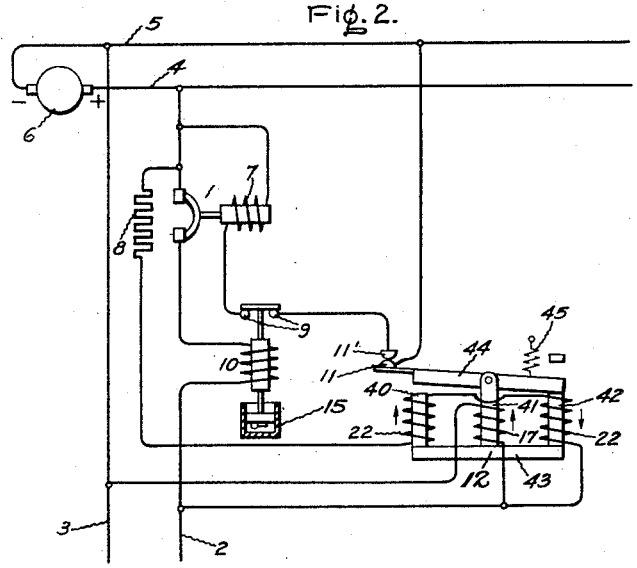
Figure 3:
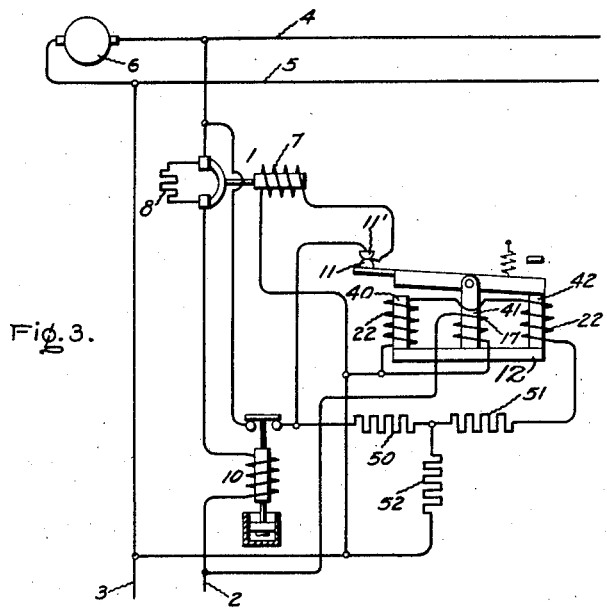
Figure 4:
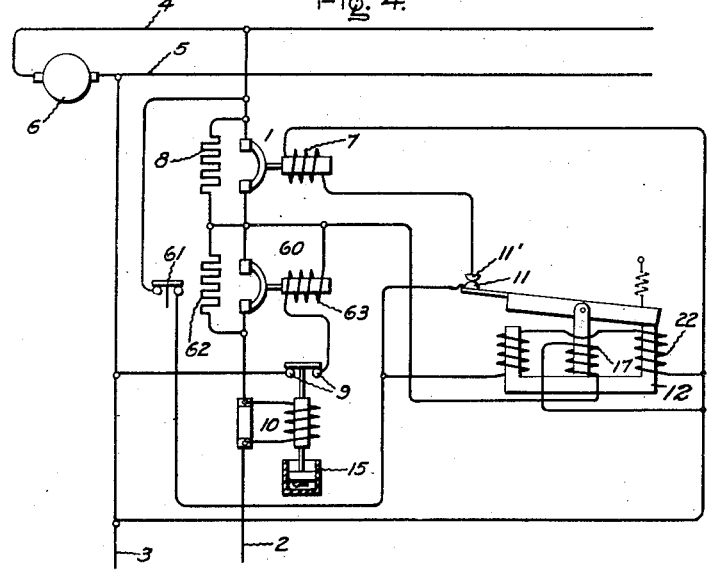
Figure 5:
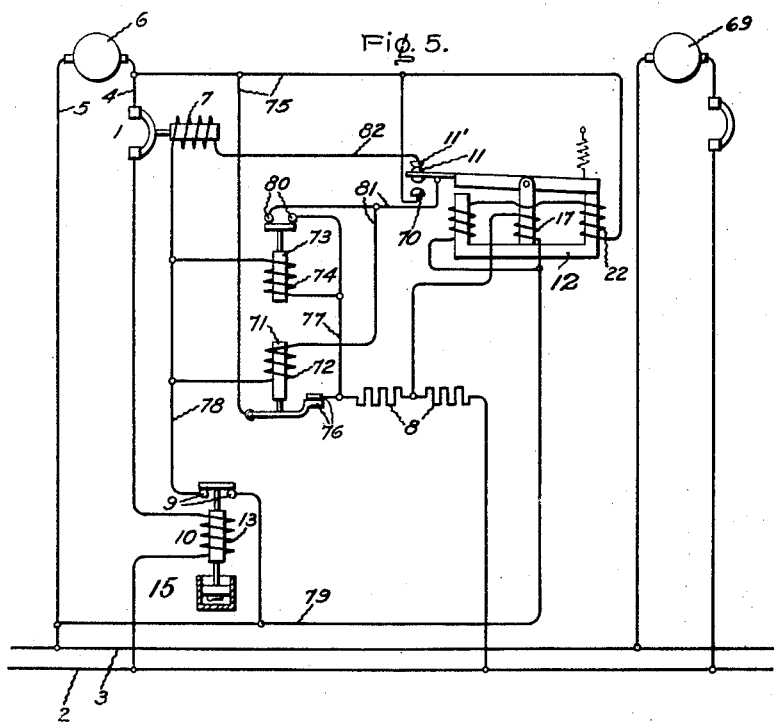

Referring to the accompanying drawings, Fig. 1 is a diagram showing one embodiment of my invention for automatically reclosing the connection between a source of current and a load circuit when the load conditions on the circuit are normal and the circuit is not supplied with current at any other point; Figs. 2, 3 and 4 are modifications of the embodiment shown in Fig. 1; and Fig. 5 is a diagram showing a modification of my invention for automatically closing the connection between a source of current and a load circuit when the load conditions on the circuit are normal, in which modification the circuit is arranged to be supplied with current at one or more points.

Referring to Fig. 1, 1 represents a circuit breaker which is arranged to connect the conductor 2 of a load circuit 2, 3 to the conductor 4 of a supply circuit 4, 5 connected to a source of current 6, shown as a direct current generator. The circuit breaker 1 may be of any suitable type and as shown it is provided with a closing coil 7 which, when energized, maintains the circuit breaker in its closed position thereby connecting the conductors 2 and 4 directly together. 8 represents a current limiting impedance, preferably a resistor, which is connected to the contacts of the circuit breaker 1 so that it is inserted in series with the conductors 2 and 4 when the circuit breaker is open, but is short circuited when the circuit breaker is closed. Obviously any other suitable means may be employed for rendering the resistor 8 ineffective when the circuit breaker is closed.

The closing coil 7 of the circuit breaker is connected to any suitable source such as the supply circuit 4, 5 through the contacts 9 of an overload relay 10 and the contacts 11 and 11' of a reclosing relay 12. The overload relay 10 is provided with a winding 13 which is connected in series with the load circuit 2, 3 and is arranged so that it causes the relay to open its contacts 9 when the load current exceeds a predetermined value. The overload relay 10 is also provided with any suitable means such as the dash-pot 15 whereby the contacts 9 may be opened either instantly or a predetermined interval after the operating coil 13 is sufficiently energized to operate the relay but are not closed until a predetermined interval after the winding 13 is deenergized.

The reclosing relay 12 may be a polarized relay of any suitable construction and as shown in this figure it comprises an armature 16 pivotally mounted within a winding 17 connected across the load circuit 2, 3 and between the pairs of polar projections 18, 18' and 19, 19' having opposite polarities. The armature 16 carries the contact 11 which engages the stationary contact 11' when the relay is in its reclosing position. A spring 20 tends to maintain the contact 11 out of engagement with contact 11'. The magnetic structure 21 of the relay may be either permanently magnetized or magnetized by a winding 22 energized from any suitable source such as the supply circuit 4, 5. The magnetic structure is magnetized so that the polar projections 18 and 19 are of opposite polarity and are of the same polarity as the ends 23 and 24, respectively, of the armature 16. With such an arrangement, it is apparent that when the contacts 11 and 11' are open each end of the armature 16 is adjacent to a polar projection of the same polarity and therefore the armature tends to move on its pivot in a direction to close the contacts. By adjusting the spring 20 the relay can be made to close its contacts 11 and 11' when the voltage impressed upon the terminals of the operating winding 17 is above any very small predetermined value. The resistance of the operating winding 17 is high so that an excessive current does not flow through it when the circuit breaker is closed and full voltage is impressed upon the load circuit. In order to insure that the magnetic structure 21 is sufficiently demagnetized so that the spring 20 will open the contacts 11 and 11' when the overload relay 10 operates due to an overload on the load circuit, the circuit of the polarizing winding 22 of the reclosing relay is completed through the contacts 9 of the overload relay 10.

The operation of the embodiment shown in Fig. 1 is as follows:—With the circuit breaker 1 closed and a normal load on the load circuit 2, 3, the apparatus is in the condition shown in the drawing. Since full potential is impressed upon both windings of the reclosing relay 12, the contacts 11 and 11' are closed and consequently the closing circuit of the circuit breaker is completed from the supply conductor 4 through conductor 30, overload relay contacts 9, conductor 31, relay contacts 11 and 11', conductor 32, closing coil 7 of the circuit breaker, conductor 33 to the supply conductor 5.

In case of an overload or a short circuit on the load circuit 2, 3, the overload relay 10 operates and instantly opens its contacts 9. The opening of these contacts deenergizes the closing coil 7 of the circuit breaker and also the polarizing coil 22 of the reclosing relay 12. This results in the opening of the circuit breaker 1 and of the contacts 11 and 11' of the reclosing relay The opening of the circuit breaker inserts the current limiting resistor 8 in series with the load circuit thereby decreasing the load current to a very small value. Inasmuch as the current limiting resistor 8 is in series with the load resistance the potential drop across these two sections of the circuit is in proportion to their respective resistance values. In case of a short circuit, the load resistance is very small and therefore the potential drop across this portion of the circuit is also very small. As the load resistance increases the potential drop across it also increases.

At a definite time after the circuit breaker opens, which is determined by the setting of the dashpot 15, the overload relay 10 returns to its normal position and recloses its contacts 9. The circuit of the closing coil 7, however, is still open at the contacts 11 and 11' of the reclosing relay 12. The closing of the overload relay contacts 9, however, immediately energizes the polarizing coil 22 of the reclosing relay.

When the load resistance increases to a value approximately equal to its normal full load value, the potential drop across the load circuit and consequently across the winding 17 of the reclosing relay 12 is sufficiently high to cause the reclosing relay to close its contacts 11 and 11' if the polarizing winding 22 is energized. Since the overload relay contacts 9 and the reclosing relay contacts 11 and 11' are now closed, the above-traced circuit of the closing coil 7 of the circuit breaker is completed and the circuit breaker is closed thereby impressing full potential upon the load circuit 2, 3. This high potential simply holds the reclosing relay contacts 11 and 11' closed more tightly and the system remains in this condition until another overload or short circuit occurs on the load circuit.

The modification of my invention shown in Fig. 2 is similar to the embodiment of my invention shown in Fig. 1, except that a reclosing relay of a different construction is shown and the polarizing coil 22 thereof is connected in series with the current limiting resistor 8 instead of directly across the supply circuit 4, 5. The polarizing relay shown in Fig. 2 comprises a magnetic structure having three polar projections 40, 41 and 42, a common yoke 43 and an armature 44 pivotally mounted in front of the polar projections. A spring 45 biases the armature towards the pole 40. The polarizing winding 22 is equally distributed upon the polar projections 40 and 42 and is so wound that these polar projections are of opposite polarity. The operating winding 17 which is connected across the load circuit 2, 3 is wound on the polar projection 41 so that this projection is of the same polarity as the projection 40. Therefore, the magnetomotive force produced by the current in the winding 17 opposes the magnetomotive force produced by the portion of the winding 22 on the projection 40 and aids the magnetomotive force produced by the portion of the winding 22 on the projection 42. Consequently, when a predetermined voltage is impressed upon the winding 17, the force exerted between the armature 44 and the projection 42 is sufficient to move the armature into the position shown against the action of the spring 45. Since the air gap between the armature 44 and the polar projection 42 is reduced and the air gap between the armature 44 and the polar projection 40 is increased when the relay is moved into its closing position, it is apparent that the magnetomotive force that is required to maintain the armature in its reclosing position against the action of the spring 45 is much less than the magnetomotive force necessary to move the armature into its reclosing position. The relay 12 is designed so that when the circuit breaker is closed and full potential is impressed upon the load circuit, sufficient current flows through the operating winding 17 to maintain the relay in its reclosing position. The operation of the modification shown in Fig. 2 is obvious from the above description of the embodiment of my invention shown in Fig. 1.

The modification of my invention shown in Fig. 3 is similar to the embodiment shown in Fig. 1 except that the type of reclosing relay shown in Fig. 2 is used and temperature compensating means is provided to compensate for variations in the resistance of the polarizing winding 22 of the polarized relay 12 produced by variations in the temperature thereof. Since the relay 12 is a very sensitive relay, it is apparent that small changes in the resistance of the polarizing coil materially effects the calibration thereof. It is therefore very desirable that the current through the polarizing winding 17 remains substantially constant for a given impressed voltage. Since the polarizing winding usually consists of copper wire which has a positive temperature coefficient the desired compensation may be obtained by connecting the resistors 50 and 51, which have negative temperature coefficients, in series therewith. The desired result may also be obtained by connecting a resistor 52 having a higher positive temperature coefficient than the winding 22 in parallel with the winding 22 only, or a higher positive temperature coefficient than the combination of the resistor 51 and winding 22 in parallel with the resistor 51 and the winding 22 as shown. As the resistors 50, 51 and 52 and the winding 22 become more heated, the resistance of the resistors 50 and 51 decreases and the resistance of the resistor 52 and the winding 22 increases. The resistors 50 and 51 therefore tend to allow more current to flow through the winding 22 thereby compensating for the increase in the resistance thereof. Furthermore, since the resistor 52 has a higher temperature coefficient than the winding 22 or higher than the combination of resistor 51 and winding 22, the resistance of the resistor 52 increases at a faster rate than the drop across the winding 22 and therefore more current flows through the winding. It is apparent that any desired amount of compensation may be obtained by employing different combinations of resistors having different temperature coefficients. Furthermore a similar arrangement could be used in the circuit of the operating coil 17 if it were so desired.

The operation of the modification shown in Fig. 3 is the same as the embodiment of my invention shown in Fig. 1.

The modification of my invention shown in Fig. 4 is similar to the embodiment shown in Fig. 1 except that the overload relay 10 controls a second circuit breaker 60 which is connected in series with the conductor 2 of the load circuit 2, 3 and the opening of the circuit breaker 1 is controlled by a device such as a thermostat 61 mounted on the current limiting resistor 62 which is connected in series with the load circuit when the circuit breaker 60 opens. The closing coil 63 of the circuit breaker 60 is connected to the supply circuit 4, 5 through the contacts of the circuit breaker 1 and the overload contacts 9. The closing coil 7 of the circuit breaker 1 is connected to the supply circuit 4, 5 through the contacts of the thermostat 61 and the reclosing relay contacts 11 and 11'.

The operation of this modification of my invention is as follows:—With the circuit breakers 1 and 60 closed and a normal load connected to the load circuit, the apparatus is in the condition shown in the drawing. In case of an overload or a short circuit on the load circuit 2, 3, the overload relay 10 operates and opens its contacts 9 thereby opening the circuit of the closing coil 63 of the circuit breaker 60. Circuit breaker 60 opens and inserts the resistor 62 in series with the load circuit thereby decreasing the current supplied to the load circuit. The resistor 62 is of such a value that the current that flows through the load circuit, due to a severe short circuit, is usually a little larger than the normal full load value. If the overload or short circuit is severe enough to maintain the overload relay in its operating position and remains connected to the load circuit for a sufficient length of time to heat up the resistance 62 to a predetermined value the thermostat 61 opens its contacts and deenergizes the closing coil 7 of the circuit breaker and the polarizing winding 22 of the reclosing relay. Circuit breaker 1 opens and inserts the current limiting resistor 8 in series with the load circuit 2, 3 thereby decreasing the current supplied to the load circuit to a very small value. The deenergization of the polarizing winding 22 of the reclosing relay 12 causes the relay to open its contacts 11 and 11'. After a predetermined interval determined by the setting of the dash-pot 15, the overload relay 10 returns to its normal position and closes its contacts 9 thereby connecting the closing coil 63 of the circuit breaker 60 across the supply circuit 4, 5 in series with the current limiting resistor 8. The closing coil 63 is so designed that it is not sufficiently energized at this time to close the circuit breaker 60. After the temperature of the resistor 62 has decreased sufficiently for the thermostat to close its contacts, the circuit of the polarizing winding 22 of the reclosing relay is completed. As the load resistance increases the voltage impressed upon the control winding 17 which is connected across the load circuit 2, 3 in series with resistor 62 increases and when the load resistance reaches a predetermined value the operating winding is sufficiently energized to cause the relay to close its contacts 11 and 11' thereby completing the closing circuit of the closing coil 7 through the thermostat contacts 61. Circuit breaker 1 then closes and short circuits the resistor 8 so that full potential is impressed upon the closing coil 63 of the circuit breaker 60. Circuit breaker 60 then closes and short circuits the resistor 62 so that the conductors 2 and 4 are connected directly together.

If the short circuit or overload is removed before the temperature of the current limiting resistance 62 rises sufficiently to cause the thermostat to open its contacts the circuit breaker 60 closes by the overload relay closing its contacts 9.

It will be noted that the arrangement shown in Fig. 4 allows a maximum current to be fed into the load circuit after a short circuit or an overload occurs thereon and before the circuit breaker 1 opens. This arrangement therefore is of particular utility where it is desirable to keep the load circuit energized under all conditions except a prolonged overload or short circuit.

The modification shown in Fig. 5 is especially adapted for distribution systems in which the automatic reclosing circuit breaker controls the connection between a source of current and a load circuit which is supplied at more than one point. In such a system, the control equipment for reclosing the circuit breaker has to take care of two different conditions, viz., the reclosing of the circuit breaker when the load circuit is energized at some other point and when the load circuit is not energized at any other point.

In this modification of my invention the load circuit 2, 3 is shown as being arranged to be supplied from the source 69 in addition to the source 6 which is connected to the load circuit by means of the circuit breaker 1. The current limiting resistor 8, instead of being connected permanently across the terminals of the circuit breaker as in Fig. 1, is connected across the terminals by means of any suitable electro-magnetic switching means such as a contactor 71. The operating coil 72 of this contactor is arranged to be connected across the supply circuit 4, 5 through the overload relay contacts 9 and the contacts 11 and 70 of the reclosing relay 12 which are closed when the relay is in its open position. The operating coil 72 is also arranged to be connected across the load circuit 2, 3 in series with the load resistor 8 by means of a relay 73, the operating winding of which is also connected across the load circuit in series with the load resistor 8. When the contactor 71 is closed the operating windings 72 and 74 are both connected across the supply circuit 4, 5 through the overload relay contacts 9.

It will be noted that in this modification of my invention, the operating winding 17 of the reclosing relay 12 is connected to a tap on the current limiting resistor 8 instead of being connected directly across the load circuit 2, 3. A higher voltage than the voltage across the load circuit is therefore impressed upon the terminals of operating winding when the circuit breaker is open and consequently a winding having a higher resistance may be used.

The operation of the modification shown in Fig. 5 is as follows. Under normal operating conditions the overload relay contacts 9 are closed and the contactor operating winding 72 and the relay operating winding 74 are energized. The circuit of the operating coil 74 of the relay 73 extends from the supply conductor 4 through conductor 75, contacts 76 of the contactor 71, conductor 77, operating winding 74, conductor 78, overload relay contacts 9, conductor 79 to the supply conductor 5. The energizing circuit of the operating winding 72 of the contactor 71 extends from the supply conductor 4 through the conductor 75, contactor contacts 76, conductor 77, relay contacts 80, conductor 81, operating winding 72 of the contactor 71, conductor 78, overload relay contacts 9, conductor 79 to the supply conductor 5. The circuit breaker 1 is held in its closed position by the energization of the closing coil 7, the circuit of which extends from the supply conductor 4, through the conductor 75, contactor contacts 76, conductor 77, relay contacts 80, conductor 81, reclosing relay contacts 11 and 11', conductor 82, closing coil 7, conductor 78, overload relay contacts 9, conductor 79 to the supply conductor 5. The windings 17 and 22 of the reclosing relay 12 have full potential impressed thereon so that the relay is held in its reclosing position, in which position the contacts 11 and 11' are closed. For the purpose of this specification the position in which the contacts 11 and 11' are in engagement will be called the reclosing position and the position in which the contacts 11 and 70 are in engagement will be called the open position.

In case of an overload or a short circuit on the load circuit 2, 3, the overload relay 10 operates and instantly opens its contacts 9. The opening of these contacts deenergizes the closing coil 7 of the circuit breaker 1 and also the operating coils 72 and 74 of the contactor 71 and the relay 73 respectively thereby opening each of these devices. The opening of the circuit breaker 1 and the contactor 71 completely breaks the connection between the conductors 2 and 4. The polarizing coil 22 of the reclosing relay 12 is, however, still connected across the supply circuit 4, 5 and the operating coil 17 of the reclosing relay 12 is still connected across the load circuit 2, 3 through a portion of the current limiting resistor 8 so that if the voltage across the load circuit is above a predetermined value the reclosing relay is maintained in its reclosing position. If, however, the voltage across the load circuit falls to a very low value indicating that no other source is supplying energy thereto, the operating coil 17 of the reclosing relay is not sufficiently energized to maintain the relay in its reclosing position and the spring 20 moves the relay to its open position, in which position the contacts 11 and 70 are closed thereby completing a circuit for the operating coil 72 of the contactor 71. This circuit extends from the supply conductor 4 through conductor 75, contacts 70 and 11 of the reclosing relay 12, conductor 81, operating winding 72 of the contactor 71, conductor 78, overload relay contacts 9, conductor 79 to the supply conductor 5. This circuit 4, however, is not completed until a predetermined interval, determined by the dashpot 15, after the circuit breaker opens. Contactor 71 closes and connects the current limiting resistor 8 in series with the conductors 2 and 4. The closing of the contactor 71 also completes the above-traced circuit for the operating coil 74 of the relay 73. Relay 73 closes its contacts 80 thereby completing a circuit for the operating winding 72 of the contactor 71 through the contactor contacts 76 to the supply circuit 4, 5, this circuit being in parallel with the contacts 11 and 70 of the reclosing relay 12 so that these contacts may be opened without deenergizing the contactor coil 72.

A small current is now furnished to the load circuit through the current limiting resistor 8 and this current produces a potential drop across the load resistance. This drop and the drop across the right-hand section of the current limiting resistor 8 beyond the point where the operating coil 22 is connected are available to operate the reclosing relay. As the load resistance increases the voltage impressed upon the operating coil 17 increases and the reclosing relay closes its contacts 11 and 11' when the load resistance increases to a predetermined value. The closing of the contacts 11 and 11' completes the above-traced circuit of the closing coil 7 through contacts 76 and 80 thereby closing the circuit breaker 1.

If, however, potential is maintained upon the load circuit by some other source, after the circuit breaker 1 opens, and this potential is in the right direction the reclosing relay remains in its reclosing position. The circuit of the closing coil 7 is, however, open at the contacts 76 and 80 of the contactor 71 and relay 73 respectively so that the circuit breaker remains open after the overload relay closes its contacts 9. The relay 74 remains deenergized until the potential across the load circuit is above a predetermined value usually above fifty per cent of normal. When the load resistance has increased so that the potential across the load circuit is above this predetermined value, the relay 73 operates and closes its contacts 80 thereby connecting the operating coil 72 of the contactor 71 across the load circuit in series with the current limiting resistor 8. Contactor 71 then closes and completes the above-traced circuit of the closing coil 7 of the circuit breaker. The circuit breaker 1 then closes and connects the conductors 2 and 4 together.

It will be noted that in this modification of my invention, the circuit breaker is closed in response to one potential across the load circuit if the load potential does not drop below a predetermined value after the circuit breaker opens, and is closed in response to a different potential when the load potential does drop below this predtermined value after the circuit breaker opens. Furthermore it will be noted that by using a polarized relay it is necessary for the polarity of the supply circuit to be the same as the load circuit before the circuit breaker can be closed.

The particular modification shown in Fig. 5 is not claimed specifically in this application because this modification is shown described and claimed in my copending application Serial No. 523,754, filed December 20, 1921.

While I have shown and described several modifications of my invention, I do not desire to be limited to the specific arrangements shown, but seek to cover in the appended claims all those modifications falling within the true spirit and scope of my invention.

What I claim as new and desire to secure by Letters Patent of the United States, is,—

1. In an automatic reclosing circuit breaker system, the combination with a supply circuit, a load circuit connected to said supply circuit, a circuit breaker adapted to control the connection between said supply circuit and said load circuit, an impedance adapted to be inserted in series with said supply circuit and said load circuit when said circuit braker is open and closing means for said circuit breaker, of a polarized relay for controlling the operation of said closing means comprising an operating winding connected across the load circuit so that its energization varies with the resistance of the load circuit when the circuit breaker is open and said supply circuit is energized.

2. In an automatic reclosing circuit breaker system, the combination with a supply circuit, a load circuit connected to said supply circuit, a circuit breaker adapted to control the connection between said supply circuit and said load circuit, an impedance adapted to be inserted in series with said supply circuit and said load circuit when said circuit breaker is open and closing means for said circuit breaker, of a polarized relay for controlling the operation of said closing means comprising an operating winding connected across the load circuit so that its energization varies with the resistance of the load circuit when the circuit breaker is open and said supply circuit is energized, and a polarizing winding supplied with current from said supply circuit.

3. In an automatic reclosing circuit breaker system, the combination with a supply circuit, a load circuit connected to said supply circuit, a circuit breaker adapted to control the connection between said supply circuit and said load circuit, an impedance adapted to be inserted in series with said supply circuit and said load circuit when said circuit breaker is open and closing means for said circuit breaker, of a polarized relay for controlling the operation of said closing means comprising an operating winding connected across the load circuit so that its energization varies with the resistance of the load circuit when the circuit breaker is open and said supply circuit is energized and a polarized winding, and means controlled by the current supplied from said supply circuit to said load circuit for controlling the circuit of one of the windings of said polarized relay.

4. In an automatic reclosing circuit breaker system, the combination with a supply circuit, a load circuit connected to said supply circuit, a circuit breaker adapted to control the connection between said supply circuit and said load circuit, an impedance adapted to be inserted in series with said supply circuit and said load circuit when said circuit breaker is open and closing means for said circuit breaker, of a polarized relay for controlling the operation of said closing means comprising an operating winding connected across the load circuit so that its energization varies with the resistance of the load circuit when the circuit breaker is open and said supply circuit is energized and a polarizing winding, and means controlled by the current supplied from said supply circuit to said load circuit for controlling the circuit of said polarizing winding.

5. In an automatic reclosing circuit breaker system, the combination with a supply circuit, a load circuit connected to said supply circuit, a circuit breaker adapted to control the connection between said supply circuit and said load circuit, an impedance adapted to be inserted in series with said supply circuit and said load circuit when said circuit breaker is open and closing means for said circuit breaker, of a polarized relay for controlling the operation of said closing means comprising an operating winding connected across the load circuit so that its energization varies with the resistance of the load circuit when the circuit breaker is open and said supply circuit is energized and a polarizing winding connected to said supply circuit, and means controlled by the current supplied from said supply circuit to said load circuit for controlling the circuits of said polarizing winding and said closing coil.

6. In an automatic reclosing circuit breaker system, the combination with a supply circuit, a load circuit connected to said supply circuit, a circuit breaker adapted to control the connection between said supply circuit and said load circuit, and a closing coil adapted to close said circuit breaker upon the energization thereof, of a polarized relay for controlling the energization of said closing coil comprising an operating winding connected across the load circuit so that its energization varies with the voltage across the load circuit.

7. In an automatic reclosing circuit breaker system, the combination with a supply circuit, a load circuit connected to said supply circuit, a circuit breaker adapted to control the connection between said supply circuit and said load circuit, and a closing coil adapted to close said circuit breaker upon the energization thereof, of a polarized relay for controlling the energization of said closing coil comprising an operating winding connected across the load circuit so that its energization varies with the voltage across the load circuit, and a polarizing winding supplied with current from said supply circuit.

8. In an automatic reclosing circuit breaker system, the combination with a supply circuit, a load circuit connected to said supply circuit, a circuit breaker adapted to control the connection between said supply circuit and said load circuit, and closing means for said circuit breaker, of a relay responsive to the voltage across the load circuit for controlling the operation of said closing means, and means connected in circuit with a winding of said relay for compensating for variations in the resistance thereof due to temperature changes.

9. In an automatic reclosing circuit breaker system, the combination with a supply circuit, a load circuit connected to said supply circuit, a circuit breaker adapted to control the connection between said supply circuit and said load circuit, and closing means for said circuit breaker, of a polarized relay for controlling the operation of said closing means comprising an operating winding connected across the load circuit so that its energization varies with the voltage across the load circuit, and a polarizing winding supplied with current from said supply circuit, and means connected in circuit with one of the windings of said polarized relay for compensating for variations in the resistance thereof due to temperature changes.

10. In an automatic reclosing circuit breaker system, the combination with a supply circuit, a load circuit connected to said supply circuit, a circuit breaker adapted to control the connection between said supply circuit and said load circuit, and a closing coil adapted to close said circuit breaker upon the energization thereof, of a polarized relay for controlling the energization of said closing coil comprising an operating winding connected across the load circuit so that its energization varies with the voltage across the load circuit, and a polarizing winding supplied with current from said supply circuit, and means connected in circuit with said polarizing winding for compensating for variations in the resistance thereof due to temperature changes.

In witness whereof, I have hereunto set my hand this 19th day of December, 1921.

OLIVER C. TRAVER.